United States Patent
Rowe

(10) Patent No.: US 10,877,496 B2
(45) Date of Patent: Dec. 29, 2020

(54) PRESSURE REGULATING VALVE WITH MULTI-FACED PISTON AND FLUID BOOST CHAMBER

(71) Applicant: Carroll G. Rowe, Washington, AR (US)

(72) Inventor: Carroll G. Rowe, Washington, AR (US)

( * ) Notice: Subject to any disclaimer, the term of this patent is extended or adjusted under 35 U.S.C. 154(b) by 0 days.

(21) Appl. No.: 16/534,747

(22) Filed: Aug. 7, 2019

(65) Prior Publication Data

US 2020/0004274 A1     Jan. 2, 2020

Related U.S. Application Data

(63) Continuation-in-part of application No. 16/266,746, filed on Feb. 4, 2019, which is a continuation-in-part of application No. 15/714,406, filed on Sep. 25, 2017, now Pat. No. 10,444,773, which is a continuation-in-part of application No. 15/714,406, filed on Sep. 25, 2017, now Pat. No. 10,444,773, said application No. 16/266,746 is a continuation-in-part of application No. 15/714,276, filed on Sep. 25, 2017, now Pat. No. 10,436,346, which is a continuation-in-part of application No. 15/493,415, filed on Apr. 21, 2017, now Pat. No. 10,203,705, said application No. 15/714,406 is a continuation-in-part of application No. 15/493,415, filed on Apr. 21, 2017, (Continued)

(51) Int. Cl.
*G05D 16/10*     (2006.01)
*F16K 31/122*     (2006.01)

(52) U.S. Cl.
CPC ....... *G05D 16/103* (2013.01); *F16K 31/1225* (2013.01); *G05D 16/109* (2019.01); *Y10T 137/7808* (2015.04); *Y10T 137/7811* (2015.04); *Y10T 137/7834* (2015.04)

(58) Field of Classification Search
CPC ......... Y10T 137/7834; Y10T 137/7808; Y10T 137/7811; G05D 16/103; G05D 16/106; G05D 16/109; F16K 31/1225
See application file for complete search history.

(56) References Cited

U.S. PATENT DOCUMENTS 1,281,337 A * 10/1918 Frazier ................ G05D 16/103
                                                         137/505.25
3,451,423 A * 6/1969 Priese ................ F16K 37/0008
                                                         137/556

(Continued)

*Primary Examiner* — Atif H Chaudry

(57) ABSTRACT

A pressure regulator includes a piston assembly having a primary piston, secondary piston, and valve seat positioned inside an internal chamber divided into a primary chamber and a secondary chamber, such that the primary piston and valve seat are positioned inside the primary chamber and the secondary piston is positioned inside the secondary chamber, where the piston assembly moves longitudinally along the axis of the internal chamber in response to the pressures exerted on the primary piston and valve seat by a working liquid flowing into the primary chamber, and where a supplemental fluid is selectively introduced into the secondary chamber to exert a force on the secondary piston to modify the longitudinal movement of the piston assembly and thereby regulate flow of the working fluid through the primary chamber.

6 Claims, 3 Drawing Sheets

Related U.S. Application Data now Pat. No. 10,203,705, and a continuation-in-part of application No. 15/206,037, filed on Jul. 8, 2016, now Pat. No. 9,891,635, said application No. 15/714,276 is a continuation-in-part of application No. 15/206,037, filed on Jul. 8, 2016, now Pat. No. 9,891,635.

(60) Provisional application No. 62/460,755, filed on Feb. 18, 2017, provisional application No. 62/333,451, filed on May 9, 2016, provisional application No. 62/326,056, filed on Apr. 22, 2016, provisional application No. 62/190,630, filed on Jul. 9, 2015.

(56) References Cited

U.S. PATENT DOCUMENTS

| | | | | |
|---|---|---|---|---|
| 3,454,041 A | * | 7/1969 | Masson | F16K 15/14 137/505.25 |
| 3,534,763 A | * | 10/1970 | Lucardie | F16K 31/143 137/219 |
| 8,424,561 B1 | * | 4/2013 | Rowe | G05D 16/106 137/508 |

* cited by examiner

PRESSURE REGULATING VALVE WITH MULTI-FACED PISTON AND FLUID BOOST CHAMBER

CROSS-REFERENCE TO RELATED APPLICATIONS

This application is a continuation-in-part of U.S. patent application Ser. No. 15/714,406, filed on Sep. 25, 2017 and entitled "Pressure Regulating Valve with Multi-Pronged Piston Assembly" and is also a continuation-in-part of U.S. patent application Ser. No. 16/266,746, filed on Feb. 4, 2019 and entitled "Air-Pressure Controlled Piston and Valve Configuration." The complete disclosures of these applications are hereby incorporated by reference.

STATEMENT REGARDING FEDERALLY SPONSORED RESEARCH OR DEVELOPMENT

Not applicable.

BACKGROUND OF THE INVENTION

Pressure control valves, or pressure regulators, are used to automatically increase, decrease, turn on, turn off, or otherwise regulate the flow of a liquid or gas at certain pressures. In many cases, these valves serve to maintain a reduced outlet pressure regardless of variations in the inlet pressure of the fluid. These types of pressure reducing valves are used primarily for safety purposes and can be implemented in a variety of areas, including the aircraft industry, cooking, the oily and gas industry, and many others. In one application, pressure control valves are used in compressed air foam systems (CAFS) used for firefighting, in which the value may be used to deliver an appropriate quantity of water or a mixture of water and surfactant. Many existing pressure control valves and regulators use a spring-loaded poppet valve as the pressure reducing or restrictive element and a diaphragm to sense the pressure changes. A spring is typically used to exert a force on the sensing element and to open the valve.

In many instances, such as around pump proportioning systems, it is advantageous to have a control valve lower inlet pressure to the pump, as variations of 100 pounds or greater in hydrant pressure is not uncommon. The present invention allows for the introduction of a selectable pressure that is capable of being maintained to the pump inlet over a full range of hydrant pressures, even in hydrants with pressures exceeding 200 psi.

BRIEF SUMMARY OF THE INVENTION

The present invention is directed to a pressure control valve or flow regulator with an incorporated shut-off mechanism for use between a pressurized fluid source and a pump inlet (the pump inlet being fluidically connected to the pressure regulator outlet). The flow regulator uses two pistons, connected by a number of connecting pins such that the pistons move as an integral reciprocating piston assembly. The piston assembly moves longitudinally within the device, with one piston moving within a primary pressure chamber and the second piston moving within a secondary pressure chamber. Each of the pistons moves along the axis of the respective pressure chamber such that the piston assembly acts as the pressure regulating component of the valve. The piston assembly moves such that a valve seat is capable of moving freely toward and away from the exit end of an inlet tube, allowing the user to control the flow through the device to the outlet port. This valve seat, when positioned entirely rearward such that it contacts the inlet tube, is able to prevent the flow of liquid through the device altogether. As the piston assembly, and thus the valve seat, moves away from the inlet tube, flow into the primary chamber (and therefore through the device) is allowed. The second piston allows a secondary pressure to be applied to balance, counteract, or otherwise regulate movement of the piston assembly, as changes in pressure to the secondary piston will work with or against the pressures acting on the primary piston. In this regard, it may be seen that the secondary piston may "boost" regulation of the piston.

When used in a compressed air foam system, the invention allows the engine powering the system to run at an increased rpm at the same discharge pressure. This provides numerous advantages in practical firefighting applications. This invention is also advantageous in foam concentrate proportioning systems using what is commonly called "around the pump" systems, where a portion of the discharge pump is routed through a venturi back into the suction side of the pump. In this use, the venturi is used to introduce foam concentrate into the stream of water being pumped. For the venturi to be effective in producing the volume of foam concentrate required, a specified differential of pressure between the inlet and pressure side of the pump is necessary. The invention is capable of producing this differential of pressure.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Figure 1:
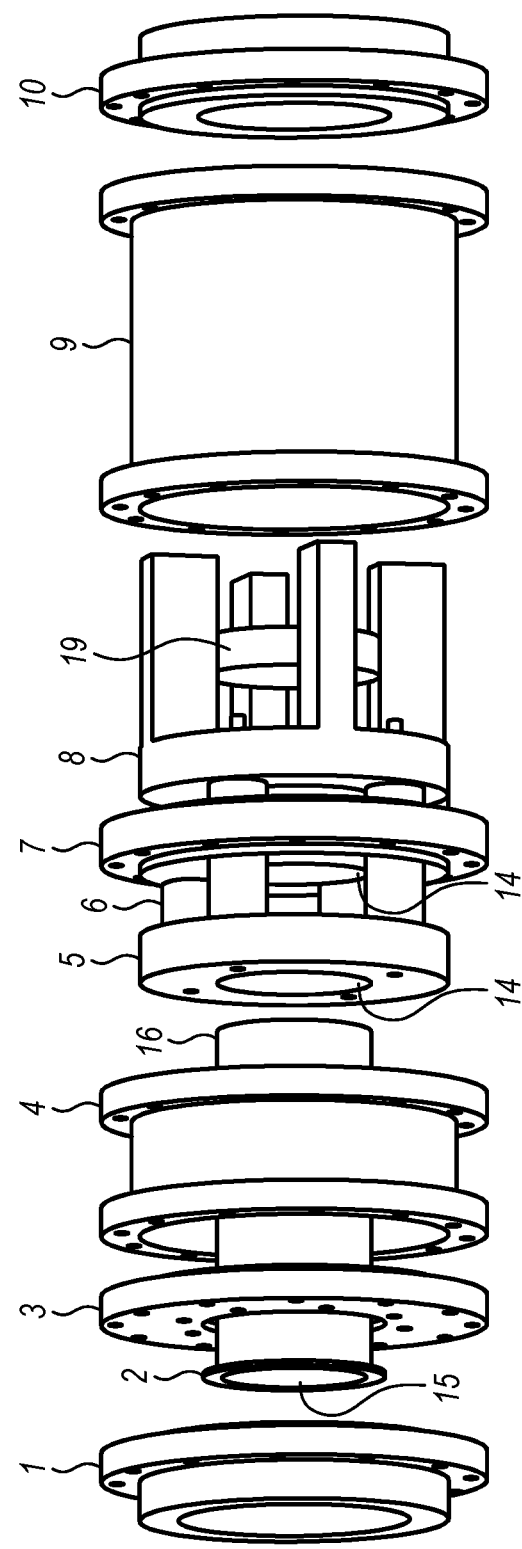
FIG. 1 shows an exploded perspective view of one embodiment of the pressure regulator of the present invention.
Figure 2:
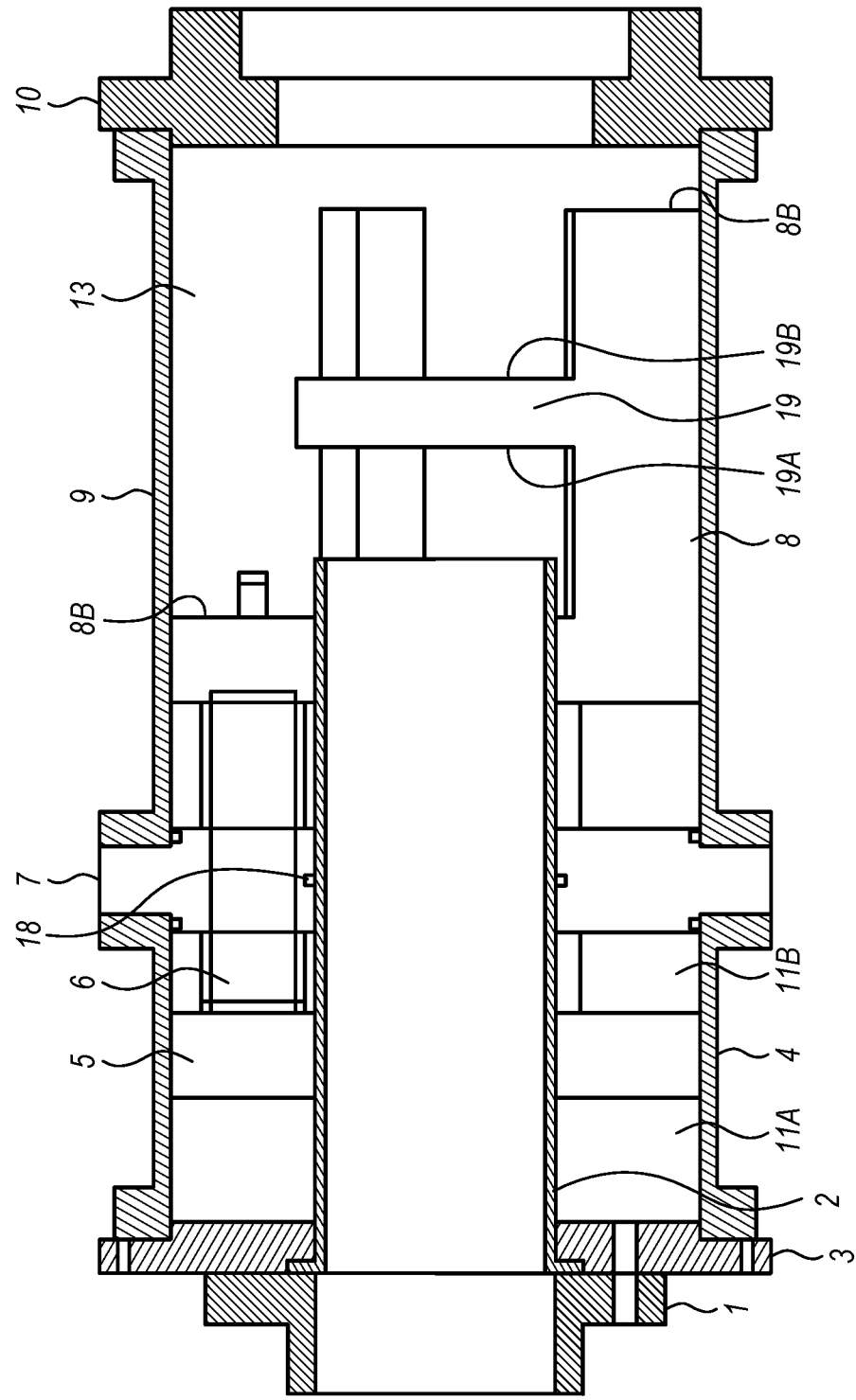
FIG. 2 shows a cut-away side view of one embodiment of the pressure regulator of the present invention.
Figure 3:
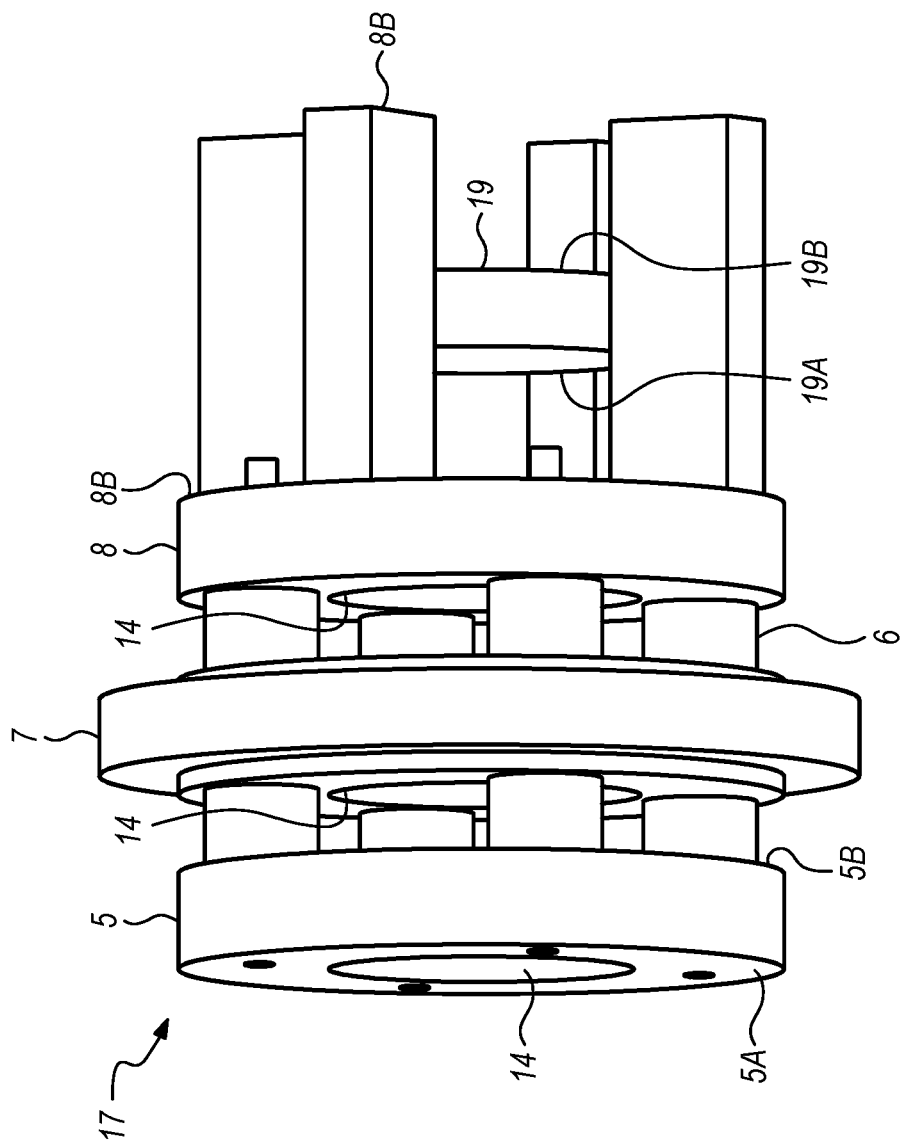
FIG. 3 shows a perspective view of one embodiment of the piston assembly of the present invention.

With regard to FIGS. 1-3, the general design for one embodiment of the pressure regulator of the present invention may be described. The pressure regulator generally comprises a device chamber (separated into a primary chamber 13 and a secondary chamber 11), an inlet port 1 and an outlet port 10, an inlet tube 2 configured to extend from the inlet port 1 to a point inside the primary chamber 13, and a piston assembly 17 configured to be positioned inside the device chamber. The piston assembly 17 includes two pistons 5, 8 joined by connecting pins 6 such that the entire piston assembly 17 is configured to move within the device chamber as a single unit. The device is configured such that as fluid enters the inlet port 1, it travels through the inlet tube 2, into the primary chamber 13, and out of the primary chamber 13 through the outlet port 10. As the piston assembly 17 moves within the device chamber (as described more fully below), the device acts to regulate the outlet pressure of the fluid (thereby allowing for the selective control of the fluid inlet pressure into pump, for example).

Each of these components and their function to regulate fluid flow is described more fully below.

As noted above, the device of the present invention includes an internal device chamber. The device chamber is a hollow compartment surrounded by a housing, thereby providing an internal chamber of the device. The device chamber is split into two chambers, a primary chamber 13 (forward chamber) and a secondary chamber 11 (rearward chamber), with one piston 8 (the primary piston) positioned inside the primary chamber 13 and the other piston 5 (the secondary piston) positioned inside the secondary chamber 11. The primary chamber 13 is surrounded by housing 9 and the secondary chamber 11 is housed with housing 4. A dividing panel 7 is positioned inside the device chamber to separate the primary 13 and secondary 11 chambers, with the dividing panel 7 having an aperture 14 allowing the connecting pins 6 of the piston assembly 17 to extend through the dividing panel 7 such that the primary piston 8 is in the primary chamber 13 and the secondary piston 5 is in the secondary chamber 11. Sealing elements may be positioned between the dividing panel inner and the chamber housing to keep a seal between primary chamber 13 and secondary chamber 11, thereby preventing fluid to flow between the chambers 13, 11 Each of the chambers 13, 11 is described more fully below.

In order to provide fluid flow through the device, the device includes an inlet port 1 at one end and an outlet port 10 at its other end. The inlet port 1 and outlet port 10 are fluidically connected by the inlet tube 1 and device chamber, and more particularly by the inlet tube 1 and primary pressure chamber 13. The inlet port 1 is preferably an aperture in the most rearward device, thus allowing access to the internal chamber of the device. An outlet port 10 is positioned at the other end of the device—providing a means for allowing fluid to exit the device into the connected pumping equipment. As noted, the outlet port 10 is fluidically connected to the primary chamber 13 of the device; however, as noted above, the primary chamber 13 and secondary chamber 11 are not fluidically connected, as a seal is positioned at the dividing panel 7 separating the primary chamber 13 and secondary chamber 11. This separate chamber configuration is an important aspect of the present invention, and the fluid (likely a liquid, such as water, for example) being sent through the device and into the attached pump (such fluid may be referred to herein as the "working fluid") must be introduced into the primary chamber 13 so that it can exit through the outlet port 10. As such, the device includes an inlet tube 2 having a passageway 15 that extends from its inlet end at the inlet port 1, through the secondary chamber 11 and dividing panel 7, and into the primary chamber 13 where the exit end 16 of the tube 2 is positioned—thereby allowing the working fluid to bypass the secondary chamber 11 such that the working fluid does not flow into the secondary chamber 11. In the preferred embodiment, the piston assembly 17 (described below) includes a bore 14 along its central axis allowing the inlet tube 2 to extend through the central bore 14 of the piston assembly 17 (which, when the piston assembly 17 is positioned inside the device, is the same bore 14 in the center of the dividing panel 17). The inlet tube 2 is rigidly connected to the end cap of the device such that the inlet tube 2 does not move as the piston assembly 17 moves within the device. As such, the piston assembly 17 moves along the inlet tube 2, regulating flow of the working fluid from the exit end 16 of the inlet tube 2 as the piston assembly 17 moves (as described more fully below). Sealing elements 18 are preferably incorporated around the inlet tube 2 between the outer walls of the inlet tube 2 and the inner walls of the aperture 14 in the dividing panel 7 to facilitate the fluid-tight seal between the primary chamber 13 and secondary chamber 11.

As indicated above, the device of the present invention includes a piston assembly 17 having a primary piston 8 and a secondary piston 5 connected by connecting pins 6 such that the piston assembly 17 moves integrally within the device. As noted, the connecting pins 6 extend through the diving panel 7 separating the primary chamber 13 and secondary chamber 11 such that the primary piston 8 is in the primary chamber 13 and the secondary piston 5 is in the secondary chamber 11. The piston assembly 17 includes a central aperture 14 extending along its axis, providing a cylindrical area where the inlet tube 2 of the device may be positioned. As the tube 2 is positioned inside the piston assembly 17, the inlet end 15 of the inlet tube 2 is positioned at the inlet port 1 of the device and the exit end 16 of the inlet tube 2 is positioned inside the primary chamber 13—allowing fluid flow from the inlet port 1 into the primary chamber 13, from where it may flow out through the outlet port 10.

The piston assembly 17 includes a valve seat 19 (i.e. an inlet tube sealing element) at its forward end, the valve seat 19 acting as the sealing element for the inlet tube 2, thus allowing or restricting flow from the exit end 16 of the inlet tube 2 into the primary chamber 13. That is, as the piston assembly 17 moves within the device, the valve seat 19 moves toward and away from the exit end 16 of the inlet tube 2 (which is rigidly connected to the device housing and thus does not move as the piston assembly 17 moves). When the piston assembly 17 moves such that the valve seat 19 is fully rearward and thus contacting the exit end 16 of the inlet tube 2, flow is restricted from the exit end 16 of the inlet tube 2. In this position, the device is said to be in the closed position. Alternatively, when the valve seat 19 is in the fully forward position (as far from the exit end 16 of the inlet tube 2 as possible), unrestricted flow of the working fluid from the inlet tube 2 into the primary chamber 13 is allowed. Thus, the device is said to be in the fully open position. Of course, the valve seat 19 may be positioned at any point between the closed position and fully open position, providing regulated flow of the working fluid from the inlet tube 2 at a desired pressure. In order to facilitate sealing of the exit end 16 of the inlet tube 2, the valve seat 19 (unlike the remaining portion of the piston assembly 17) is solid and does not have an aperture at its central axis, as shown. Of course, the circumference of the valve seat 19 should be at least equal to the circumference of the exit end 16 of the inlet tube 2, such that when the valve seat 19 is in contact with the exit end 16 of the inlet tube 2, the valve seat 19 covers the entire exit end 16 of the inlet tube 2, preventing flow of fluid from the inlet tube 2 into the primary chamber 13.

Movement of the valve seat 19 between the closed position and fully open position (or at a partially open, regulated position therebetween) is facilitated by movement of the piston assembly 17 inside the device. As indicated, the piston assembly 17 moves longitudinally inside the device such that the valve seat 19 moves rearward into the closed position and forward into a partially or fully open position. Movement of the piston assembly 17 is facilitated (at least partially) by the pressure exerted by the working fluid on the primary piston 8 of the device. That is, as the working fluid flows through the inlet tube 2 into the primary chamber 13, it exerts a force on the rearward face 19A of the solid valve seat 19, moving the piston assembly 17 into the forward direction (toward the partially or fully open position). Unimpeded, as the pressure of the working fluid increases, so does the force exerted on the rearward face 19A of the valve seat 19—eventually moving the valve seat 19 into the fully open position. As the pressure of the working fluid builds inside the primary chamber 13 (due to, for example, a higher water flow into the device than is being used by the pump), back pressure is exerted against the forward face 19B of the valve seat 19 and on the forward faces 8B of the primary piston 8. As the back pressure builds and the sum of the forces exerted on the forward face 19B of the valve seat 19 and forward faces 8B of the primary piston 8 exceeds the force exerted on the rearward face 19A of the valve seat 19, the piston assembly 17 beings to move back in the rearward direction (toward the closed position), and thus, the valve seat 19 moves toward the exit end 16 of the inlet tube 2. If the back pressure continues to build, the valve seat 19 will move fully rearward into the closed position. To maintain a steady, regulated pressure, continued positioning of the valve seat 19 at the appropriate position (i.e. an appropriate distance from the exit end 16 of inlet tube 2) is necessary.

To help facilitate regulation of the working fluid by maintaining the valve seat 19 at the appropriate position, supplemental fluid may be introduced into the secondary chamber 11 such that this supplemental fluid may exert a force on the secondary piston 5 to "boost" (supplement) the force exerted on the valve seat 19 by the working fluid. In one embodiment, the device may be configured such that the supplemental fluid may be introduced into the secondary chamber 11 on either or both sides of the secondary piston 5. In one use, for example, the supplemental fluid may be introduced into a rearward secondary chamber 11A such that it exerts a force on the rearward face 5A of secondary piston 5 to counteract any opposite forces exerted on the forward face 19B of the valve seat 19 and forward face 8B of the primary piston 8 due to back pressure), such that the valve seat 19 can be steadied when the forces reach the desired equilibrium position. This boost of pressure on the rear face 5A of secondary piston 5 will assist in moving the piston assembly 17 forward and thus opening the valve seat 19 further. Alternatively, the supplemental fluid may be introduced into a forward secondary chamber 11B such that it exerts a force on the forward face 5B of the secondary piston 5, thus assisting in moving the piston assembly 17 rearward such that the valve seat 19 moves toward the closed position. The supplemental fluid is preferably pressurized air, but other pressurized gases or liquids (including the same liquid source of the working fluid) may be used.

The selective control of supplemental fluid into one or both of the rearward 11A and forward 11B chambers of the secondary chamber 11 can be facilitated by valves (not shown)—which may be used to both introduce pressure into the secondary chamber 11 and relieve pressure from the secondary chamber 11. In one embodiment, an electronic controller or pressure switch is connected to the supply line for the supplemental fluid, allowing for automatic control of supplemental fluid into the secondary chamber 11. In the event the pressure at the pump inlet (i.e. at the device outlet port 10) exceeds the desired pump pressure, the controller may introduce supplemental fluid into the forward side 11B of the secondary chamber 11 to assist in the closing of the valve seat 19 by exerting force on the forward face 5B of the secondary piston 5 (thus moving the piston assembly 17 in the rearward direction). If pressure at the pump inlet (i.e. at the device outlet port 10) is lower than the desired pressure, the pressure in the forward side 11B of the secondary chamber 11 may be released, thereby allowing the piston assembly 17 to move in the forward direction (to a partially or fully open position, as needed). Introduction of supplemental fluid in the rearward chamber 11B of secondary chamber 11 may be selectively used to further assist in opening or closing the valve seat 19. Thus it may be seen that the selective introduction of supplemental fluid into the secondary chamber 11 allows the user to achieve a desired regulation of working fluid pressure at the device outlet port 10.

The structure of the regulator device of the present invention being described, the operation of the device may now be described. Generally speaking, as noted above, a pressurized working fluid (preferably a liquid) flows from a pressurized fluid source through the inlet port 1, into the passageway 15 of the inlet tube 2, and into the primary pressure chamber 13. This flow of working fluid will exert a pressure on the rearward face 19A of the valve seat 19 of the piston assembly 17. This exertion of pressure on the rearward surface 19A of the valve seat 19 moves the piston assembly 17 forward toward the outlet port 10 of the device. As the piston assembly 17 moves forward, the valve seat 19 moves away from the exit end 16 of the inlet tube 2, thereby opening the valve and allowing flow of the working fluid through the device. As the working fluid moves through the primary chamber 13 of the device (from the tube outlet 16 through the primary chamber 13 out of the outlet port 10) pressure is exerted on the forward surface 19B of the valve seat 19 and on the forward surface(s) 8B of the primary piston 8. Once the forces applied on these forward surfaces 19B, 8B exceeds the force applied on the rearward surface 19A of the valve seat 19, the piston assembly 17 begins to move in the opposite (rearward) direction—moving the valve seat 19 toward the closed position. This rearward movement of the piston assembly 17 occurs until the pressure exerted on the forward faces 19B, 8B of the valve seat 19 and primary piston 8 and the pressure exerted on the rearward face 19A of the valve seat 19 equalize, thus creating a regulation of the pressure of working fluid that flows out of the outlet port 10. The precise position at which the piston assembly 17 reaches equilibrium may be modified by varying the areas of the valve seat 19 and primary piston 8.

In the event the working fluid pressure is too high for the backward pressure (i.e. the pressure exerted on the forward faces 19B, 8B of the valve seat 19 and primary piston 8) to overcome, and is greater than the desired pressure at the pump inlet, the supplemental fluid may be introduced into the secondary chamber 11 to assist in the regulation of the working fluid pressure. The supplemental fluid may be introduced into the forward side 11B of the secondary chamber 11 in order to exert a force on the forward face 5B of the secondary piston 5 (or if necessary, into the rearward side 11A of the secondary chamber 11 in order to exert a force on the rearward face 5A of the secondary piston 5). Once the supplemental pressure (pressure exerted on the secondary piston 5 by the supplemental fluid in the secondary chamber 11) and the primary pressure (pressure exerted on the valve seat 19 and primary piston 8 by the working fluid in the primary chamber) reach equilibrium, the piston assembly 17 will maintain its position in the device and the desired flow of the working fluid can be maintained. Controlling the amount of supplemental pressure into the secondary chamber 11 allows the user to control movement of the piston assembly 17 to the position where the desired working fluid pressure into the pump can be maintained.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included in the disclosure. All references cited herein are hereby incorporated by reference to the extent that there is no inconsistency with the disclosure of this specification. If a range is expressed herein, such range is intended to encompass and disclose all sub-ranges within that range and all particular points within that range.

The present invention has been described with reference to certain embodiment(s) that are intended to be exemplary only and not limiting to the full scope of the present invention as set forth in the following claims.

The invention claimed is:

1. A pressure regulator for regulating the flow of a working fluid from a pressurized working fluid source, the pressure regulator comprising:
   a. an inlet port;
   b. an outlet port;
   c. an internal compartment comprising a primary chamber and a secondary chamber divided by a dividing panel;
   d. an inlet tube fluidically connecting the inlet port to the primary chamber, wherein the primary chamber is fluidically connected to the outlet port;
   e. a piston assembly extending between the primary chamber and the secondary chamber through the dividing panel, the piston assembly comprising:
      i. a primary piston positioned inside the primary chamber;
      ii. a secondary piston positioned inside the secondary chamber;
      iii. a valve seat positioned inside the primary chamber, wherein the primary piston is between the secondary piston and the valve seat;
      iv. a first number of connecting appendages extending from the primary piston to the secondary piston, thereby connecting the primary piston and secondary piston; and
      v. a second number of connecting appendages extending from the primary piston to the valve seat, thereby connecting the primary piston and the valve seat;
   wherein the piston assembly is configured to slide longitudinally within the internal compartment, thereby resulting in the simultaneous sliding of the primary piston and valve seat within the primary chamber and of the secondary piston within the secondary chamber.

2. The pressure regulator of claim 1, wherein the piston assembly comprises a central bore for receiving the inlet tube, such that the piston assembly slides longitudinally along the inlet tube.

3. The pressure regulator of claim 1, wherein the valve seat is configured to seal the inlet tube when the piston is in a closed position.

4. The pressure regulator of claim 1, wherein the first number of appendages is at least two appendages.

5. The pressure regulator of claim 1, wherein the secondary chamber is configured to receive a supplemental fluid from a pressurized supplemental fluid source.

6. The pressure regulator of claim 5, further comprising an electronic controller configured to selectively control the introduction of the supplemental fluid into the secondary chamber and the removal of the supplemental fluid from the secondary chamber.

* * * * *